(12) United States Patent
Zhu et al.

(10) Patent No.: US 11,791,478 B2
(45) Date of Patent: Oct. 17, 2023

(54) REDUCED-TEMPERATURE SINTERING OF SPINEL-TYPE COATINGS AND LAYERS WITH METALLIC ALLOY POWDER PRECURSORS

(71) Applicant: Tennessee Technological University, Cookeville, TN (US)

(72) Inventors: Jiahong Zhu, Cookeville, TN (US); Yutian Yu, Cookeville, TN (US); Brian Bates, Cookeville, TN (US)

(73) Assignee: Tennessee Technological University, Cookeville, TN (US)

( * ) Notice: Subject to any disclaimer, the term of this patent is extended or adjusted under 35 U.S.C. 154(b) by 332 days.

(21) Appl. No.: 17/065,158

(22) Filed: Oct. 7, 2020

(65) Prior Publication Data

US 2021/0101208 A1 Apr. 8, 2021

Related U.S. Application Data

(60) Provisional application No. 62/911,734, filed on Oct. 7, 2019.

(51) Int. Cl.
*H01M 8/0236* (2016.01)
*B22F 3/10* (2006.01)
(Continued)

(52) U.S. Cl.
CPC .......... *H01M 8/0236* (2013.01); *B22F 1/054* (2022.01); *B22F 1/10* (2022.01); *B22F 3/10* (2013.01); *B22F 3/24* (2013.01); *H01M 8/0245* (2013.01); *B22F 2003/242* (2013.01); *B22F 2201/03* (2013.01); *B22F 2301/15* (2013.01);
(Continued)

(58) Field of Classification Search
None
See application file for complete search history.

(56) References Cited

U.S. PATENT DOCUMENTS 5,942,349 A 8/1999 Badwal
6,420,064 B1 7/2002 Ghosh
(Continued)

FOREIGN PATENT DOCUMENTS

CN 104446412 A * 3/2015

OTHER PUBLICATIONS

Yu, Y. T., J. H. Zhu, and B. L. Bates. "Effect of precursor materials on the performance of the NiFe2O4-based spinel layer for SOFC cathode-side contact application." Solid State Ionics 324 (2018): 40-48. (Year: 2018).*

(Continued)

*Primary Examiner* — Sally A Merkling
*Assistant Examiner* — Sean P. O'Keefe
(74) *Attorney, Agent, or Firm* — André J. Bahou; Lucas R. Yordy; Bradley Arant Boult Cummings LLP (57) ABSTRACT

A method of forming a spinel coating on a substrate is disclosed including the steps of coating at least a portion of the substrate with a precursor including an alloy powder, and sintering the precursor at a temperature of less than 1000 degrees Celsius to form the spinel coating. The alloy powder used for the precursor can include particles having a particle size of less than 10 micrometers. The method can be utilized to form spinel coatings as contact surfaces between electrodes and interconnects of solid oxide fuel cell (SOFC) stacks.

15 Claims, 5 Drawing Sheets

(51) Int. Cl.

| | |
|---|---|
| *B22F 3/24* | (2006.01) |
| *B22F 1/10* | (2022.01) |
| *B22F 1/054* | (2022.01) |
| *H01M 8/0245* | (2016.01) |
| *H01M 8/2432* | (2016.01) |
| *H01M 8/12* | (2016.01) |

(52) U.S. Cl.
CPC ....... *B22F 2301/35* (2013.01); *H01M 8/2432* (2016.02); *H01M 2008/1293* (2013.01); *Y02E 60/50* (2013.01)

(56) References Cited

U.S. PATENT DOCUMENTS

| | | | |
|---|---|---|---|
| 6,835,684 B2 | 12/2004 | Tietz | |
| 8,354,198 B2 | 1/2013 | Ohmori | |
| 8,962,218 B2 | 2/2015 | Zhang | |
| 9,120,683 B2 | 9/2015 | Yamanis | |
| 2008/0081007 A1* | 4/2008 | Steele | C23C 18/06 |
| | | | 429/510 |
| 2013/0129557 A1* | 5/2013 | Herchen | H01M 8/0228 |
| | | | 419/62 |

OTHER PUBLICATIONS

Bi, Z. H., J. H. Zhu, and J. L. Batey. "CoFe2O4 spinel protection coating thermally converted from the electroplated Co—Fe alloy for solid oxide fuel cell interconnect application." Journal of Power Sources 195.11 (2010): 3605-3611. (Year: 2010).*

Z.G. Lu, et al., "Development of Ni1—xCoxO as the Cathode/Interconnect Contact for Solid Oxide Fuel Cells", Electrochem. Comm., 13, p. 642 (2011).

Z.G. Yang, et al., "Electrical Contacts between Cathodes and Metallic Interconnects in Solid Oxide Fuel Cells", J. Power Sources, 155, p. 246 (2006).

X. Montero, et al., "Spinel and Perovskite Protection Layers between Crofer22APU and La0.8Sr0.2FeO3 Cathode Materials for SOFC Interconnects", J. Electrochem. Soc., 156. p. B188 (2008).

L.T. Wilkinson, et al., "Ag-Perovskite Composite Materials for SOFC Cathode-Interconnect Contact", J. Electrochem. Soc. 156(8), p. B905 (2009).

P. Singh, et al., "Solid Oxide Fuel Cells: Technology Status", Int. J. Applied Ceram. Technol., 1, p. 5 (2004).

W.J. Quadakkers, et al., "Compatibility of perovskite contact layers between cathode and metallic interconnector plates of SOFCs", Solid State Ionics, 91, p. 55 (1996).

K. Huang, et al., "Characterization of iron-based alloy interconnects for reduced temperature solid oxide fuel cells", Solid State Ionics, 86, p. 1235 (1996).

W. Schafer, et al., "Materials, interfaces and production techniques for planar solid oxide fuel cells", Solid State Ionics, 86, p. 1235 (1996).

S. Koch, et al., "Contact resistance at ceramic interfaces and its dependence on mechanical load", Solid State Ionics, 168, p. 1 (2004).

S. Mitchell, et al., "From powder to technical body: the undervalued science of catalyst scale up", Che. Sco. Re., 42, p. 6094 (2013).

Acmite Market Intelligence, "Market Report: Global Catalyst Market, 2nd Edition", Ratingen, Germany (2010).

Persistence Market Research, "Global Market Study on Membrane Separation: Water and Waster Water Segment to Witness Highest Growth by 2019", http://www.persistencemarketresearch.com/market-research/membrane-separation-market.asp, last accessed Dec. 15, 2020.

R.B. Heinmann, et al., "Recently patented work on thermally sprayed coatings for protection against wear and corrosion of engineered structures", Recent Patents on Materials Science, vol. 1, pp. 41-55 (2008).

Grand View Research, "Thermal Spray Coating Market Size Will Grow to $12.29 Billion By 2022: Grand View Research, Inc.", http://www.globenewswire.com/news-release/2015/09/23/770258/10150297/en/Thermal-Spray-Coating-Market-Size-Will-Grow-To-12-29-Billion-By-2022-Grand-View-Research-Inc.html, last accessed Dec. 15, 2020.

I. Garcia, et al., "Electrodeposition and sliding wear resistance of nickel composite coatings containing micron and submicron SiC particles", Surface and Coatings Technology, 148, pp. 171-178 (2001).

M. Ghorbani, et al., "Electrodeposition of graphite-brass composite coatings and characterization of the tribological properties", Surface and Coatings Technology, 148, pp. 71-76 (2001).

BBC Research, "Catalysts for Environmental and Energy Applications", Wellesley, USA (2010), https://www.bccresearch.com/market-research/chemicals/catalysts-environmental-energy-applications-report.html, last accessed Feb. 4, 2020.

Market and Markets, "Solid Oxide Fuel Cell Market worth $2,881 million by 2025", https://www.marketsandmarkets/com/PressReleases/solid-oxide-fuel-cell.asp, last accessed Feb. 4, 2020.

* cited by examiner

REDUCED-TEMPERATURE SINTERING OF SPINEL-TYPE COATINGS AND LAYERS WITH METALLIC ALLOY POWDER PRECURSORS

STATEMENT REGARDING FEDERALLY SPONSORED RESEARCH OR DEVELOPMENT

The subject matter herein was funded in part by Department of Energy Grant No. DE-FE0026210 and National Science Foundation Grant No. CMMI-1362680.

CROSS-REFERENCES TO RELATED APPLICATIONS

This application is a non-provisional of U.S. Patent Application No. 62/911,734 filed Oct. 7, 2019 entitled REDUCED-TEMPERATURE SINTERING OF SPINEL-TYPE COATINGS AND LAYERS WITH METALLIC ALLOY POWDER PRECURSORS, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

REFERENCE TO SEQUENCE LISTING OR COMPUTER PROGRAM LISTING APPENDIX

Not Applicable

BACKGROUND OF THE INVENTION

The present invention relates to the processing and formation of spinel type coating/layers via a reactive sintering process.

One application of spinel oxide coating/layers are solid oxide fuel cell (SOFC) stacks, though such spinel oxide coating/layers can be utilized in a variety of different industries. In a planar solid oxide fuel cell (SOFC) stack, a number of cells can be stacked together to increase the output voltage and power. Within a stack, each repeating unit is composed of an anode, electrolyte, cathode, and interconnect. At both the cathode-interconnect and anode-interconnect interfaces, electrical contact layers are normally required to apply between the interconnect and electrodes during construction of an SOFC stack. The main function of a contact layer is to provide and maintain stable electrical conduction paths between the interconnect and electrodes in an SOFC stack assembly and thus minimize the ohmic resistance and stack power loss. Since both the anode and interconnect are usually metal-base materials and they experience a reducing environment in the fuel side, the contacting of these materials with each other is not a critical issue, with a nickel paste/mesh being widely used as the anode-side contact. However, since the cathode-side contact layer experiences an oxidizing environment, and this layer is in contact with both the ceramic cathode and metallic interconnect, it is more challenging to find a suitable solution for the contact between the cathode and the interconnect. Studies have showed that by improving the contact between the cathode and interconnect with an additional contact layer, the overall cell resistance may be decreased significantly, via increasing the contact area and compensating the dimensional tolerance of the parts. Furthermore, porous contact materials and the structure between the electrode and interconnect can provide gas channels as well as mechanical bonding between the electrode and the interconnect.

Perovskites with the chemical formula $ABO_3$ by far are the most studied and widely-used cathode-side contact materials; however, they generally require a sintering temperature of greater than or equal to 1000 degrees Celsius for achieving sufficient bonding strength. When the contact layer sintering is conducted at such a high temperature, a metallic interconnect is oxidized severely, which will lead to the electrical resistance increase. To reduce the sintering temperature of the perovskites, in U.S. Pat. No. 6,420,064, a perovskite-type cathode contact layer comprised of lanthanum cobaltate was disclosed, while in U.S. Pat. No. 6,835,684, a more complex perovskite-type cathode contact layer was disclosed containing numerous different elements including cobalt and lanthanum. These perovskites are electrically conductive and could be sintered at less than 1000 degrees Celsius to mechanically bond the cathode and interconnect. However, there are some issues with these perovskite contact materials, including: (1) they typically contain a significant amount of lanthanum (La) and cobalt (Co), both of which are expensive elements; (2) these Co-containing perovskites generally have a high coefficient of thermal expansion (CTE) and it is difficult, if not impossible, to achieve a desired balance in CTE, electrical conductivity, and sinterability; and (3) the perovskite powder typically has to be in the form of fine and ultrafine particles, which can be costly to produce.

To address some of the issues with the perovskite-type contact materials, in U.S. Pat. No. 8,354,198, an $AB_2O_4$ spinel-type bonding layer was disclosed, where preferably the metal element A is one or more species from the group consisting of Manganese (Mn), Copper (Cu), Nickel (Ni), Zinc (Zn), and the metal element B is one or more species from the group consisting of Co, Mn, and iron (Fe). These spinels have the desired CTE and adequate electrical conductivity as the contact material. While metal oxide powders, one metal powder and one metal oxide powder, and two metal powders can be used as the precursors in the contact paste, it was found that with at least one metal power in the contact paste, the bonding strength of the sintered layer with the cathode and interconnect was much higher than that with the metal oxide counterpart, indicating the unique attributes of utilization of starting metal powders in reactively synthesizing the spinel contact layer. In U.S. Pat. No. 9,120,683, a more specific process to fabricate a $CoMn_3O_4$ spinel layer with Co metal and Mn oxide as the starting materials was disclosed. By using a powder mixture of the metallic Co and Mn oxide the sintering temperature of the contact layer was drastically reduced and a single-phase spinel layer was achieved. It should be noted that while a phase-pure spinel layer can be achieved for the Co—Mn system, it has not been specifically demonstrated in other spinel-forming systems that a single-phase spinel layer can be achieved. For example, a mixture of Ni powder and Co powder was used to reactively form a $NiCo_2O_4$-based contact layer. While excellent area-specific resistance and bonding strength of the contact layer with other cell components were demonstrated, the contact layer was not a single spinel phase, but with the presence of other oxides in the contact layer. Furthermore, the Co-containing spinels are too expensive for practical contact-layer application, due to the high cost associated with Co material.

What is needed then are improvements in the systems and methods for producing spinel-type coatings.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a method of forming a spinel coating on a substrate including the steps of coating at least a portion of the substrate with a precursor including an alloy powder, and sintering the precursor at a temperature of less than 1000 degrees Celsius to form the spinel coating. In some embodiments, the alloy powder used for the precursor can include particles having a particle size of less than 10 micrometers. In some embodiments, the spinel coatings formed utilizing the disclosed methods can be substantially single-phase spinel coatings with little to no residual single metal oxides remaining in the coating after sintering.

During sintering in an oxidizing environment, the precursor layer can be thermally converted to a single-phase, electrically-conductive spinel layer, which in some embodiments can be used as the cathode-side contact for solid oxide fuel cell (SOFC) stacking. Due to the utilization of a metallic alloy precursor, the sintering temperature can be reduced to a temperature below 1000 degrees Celsius, and the thermal conversion of the precursor to form the desired spinel layer can be enhanced. Other applications for these thermally-converted spinel layers and structures include dense coatings that provide corrosion and oxidation resistance, Cr migration mitigation, etc. (e.g. protecting metallic interconnect in SOFC) as well as porous layers or structures for filtration, catalysis, and lubrication applications.

Another aspect of the spinel formation methods of this disclosure is that by adding a controlled amount of pore former into the contact paste, a layer with controlled porosity and pore distribution can be synthesized. The porosity can not only provide oxygen access to the contact layer for complete conversion during sintering, but also offer effective gas/liquid channeling. Finally, by employing nano-sized alloy powders, a dense coating/layer can be achieved for applications such as SOFC interconnect coating.

The method of the present disclosure makes it possible to sinter a microstructurally-uniform spinel layer at a reduced sintering temperature with the use of only a single precursor alloy powder in some embodiments. Both highly porous and highly dense spinel layers are achievable by controlling the starting alloy powder composition/morphology/size, optimization of the sintering conditions, and the optional addition of an appropriate pore former to form porous layers.

In the field of SOFCs, the methods disclosed herein offer a low-cost alternative to more expensive Co-containing contact materials such as Co-containing perovskites and spinels as well as Co-containing interconnect coatings, though the methods disclosed herein can also be utilized to produce Co-based spinel coatings to take advantage of the other benefits provided by the methods disclosed herein besides potential material cost savings. Furthermore, the processing cost will also be reduced due to the potential utilization of a single alloy powder with a controlled particle size. In the field of filtration, a highly porous layer or structure can be processed with controlled pore sizes and size distribution for targeted separation and filtering. In the field of catalysis, a high-surface area, multi-cation catalyst can be synthesized with a simple sintering step. By controlling the thermal conversion process, a porous structure with a single phase or multi-phase constituents may also have unique lubrication properties.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

As shown in FIGS. 1-3 and 8, one aspect of the present disclosure is a method 100 of forming a protective or spinel-type coating 22 on a substrate 12 including the steps of preparing 102 a precursor 14 to include an alloy powder 16, coating 104 at least a portion of the substrate 12 with the precursor 14 including the alloy powder 16, and sintering 106 the precursor 14 at a temperature of less than 1000 degrees Celsius to form the spinel-type coating 22. Sintering 106 of the precursor 14 can included applying heat 18 and/or pressure 20 to the precursor 14 in order for the alloy powder 16 in the precursor 14 to coalesce into a solid or porous spinel-type coating or layer 22 without liquefying the alloy powder 16. In some embodiments, the sintering step 106 can be performed at a temperature of between 700 and 1000 degrees Celsius. In some embodiments, the sintering step 106 can be performed at a temperature of between 800 and 950 degrees Celsius. In some embodiments, the sintering step 106 can be performed at a temperature less than 700 degrees Celsius. Sintering the precursor 14 at a temperature of less than 1000 degrees Celsius can help prevent oxidation of the substrate 12 on which the precursor 14 is applied, for instance on an SOFC interconnect or electrode. Reducing oxidation of the interconnects or electrodes on an SOFC stack can help reduce the ohmic resistance in the SOFC stack, thus increasing power output. In some embodiments, the sintering step can be performed at a predetermined pressure to facilitate sintering of the precursor 14 and help produce or more uniform microstructure for the spinel coating 22. The sintering can be performed at a pressure anywhere from 10 to 5000 psi.

The terms "coating" and "layer" are substantially synonymous and refer to any application or positioning of a thickness of material across or over some or all of a substrate or between two substrates. The terms coating and layer may be used interchangeably herein.

Figure 1:
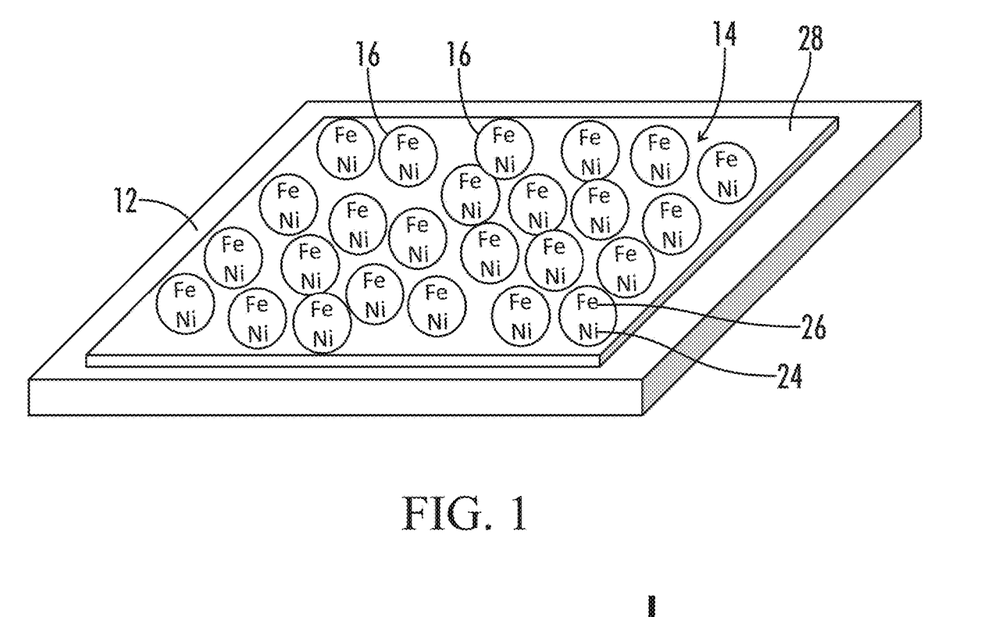
FIG. 1 is a perspective view of one embodiment of a substrate coated with a precursor for forming a spinel coating, the precursor including an alloy powder of Ni and Fe metals.
Figure 2:
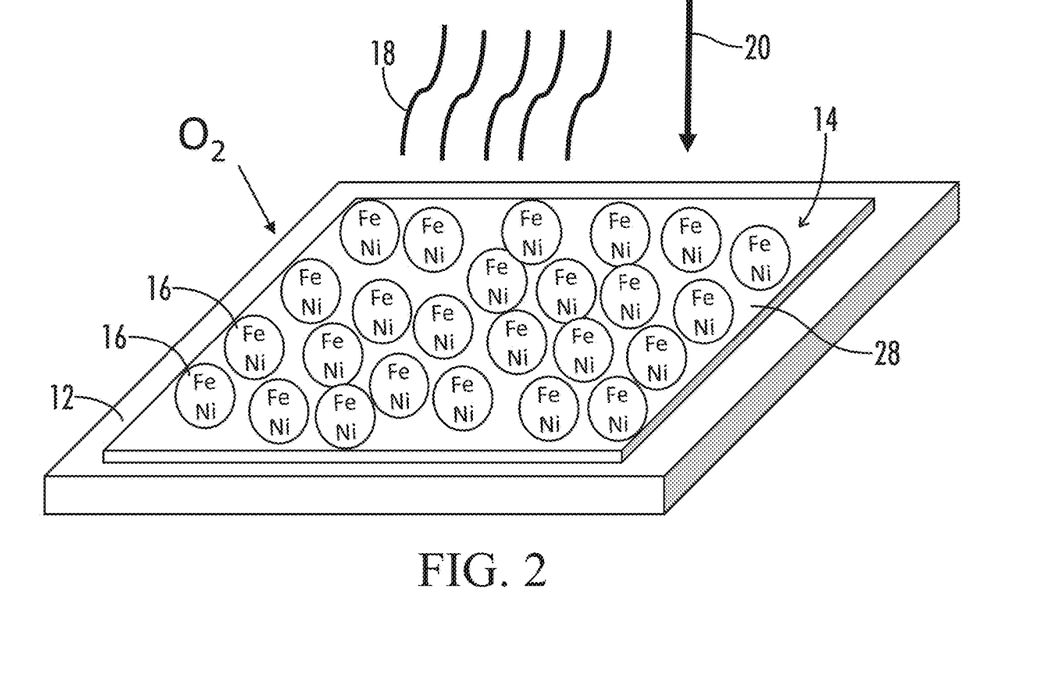
FIG. 2 is a perspective view of the precursor on the substrate of FIG. 1 being sintered by applying heat and pressure to the precursor to form the spinel coating.
Figure 3:
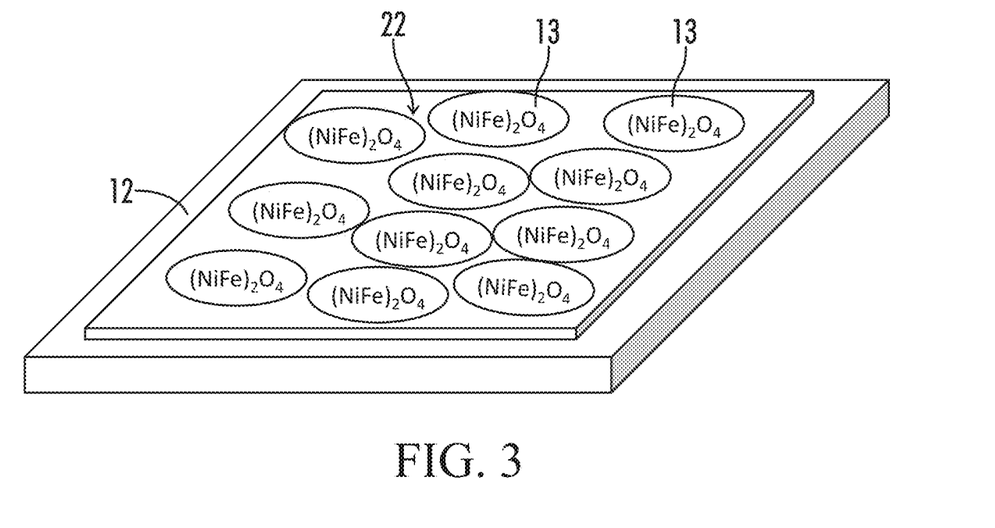
FIG. 3 is a perspective view of the precursor of FIG. 2 thermally converted after sintering to a $NiFe_2O_4$ spinel coating.

Spinel-type coatings or layers 22 can be coatings that include spinel chemical compounds 13 including at least two oxidized metals. For instance, spinel coatings can include those compounds having a general chemical composition of $ABO_3$ or $AB_2O_4$, wherein A is a first metal element and B is a second metal element. In some embodiments, the alloy powder 16 can be made from an alloy of at least two metal elements 24 and 26 corresponding to A and B respectively in the above noted chemical equations. In some embodiments, a first metal element 24 of the metal alloy powder 16 can be one or more species from the group consisting of Mn, Cu, Ni, or Zn, and a second metal element 26 of the metal alloy powder 16 can be one or more species from the group consisting of Co, Mn, and Fe. In some embodiments, the metal alloy powder 16 can be made from an alloy of Ni and Fe.

Spinel-type coatings or layers 22 may also include compounds with more than two oxidized metals, for instance those spinels having the general composition $ABC_3O_4$, or various other suitable compositions. For instance, in some embodiments, the precursor 14 can include a multi-component alloy powder 16 such as a ternary Fe—Ni—Co alloy to sinter or synthesize a doped spinel such as $(Ni,Fe,Co)_3O_4$ for further improving the formability/stability of a single-phase spinel coating or layer 22 as well as the electrical conductivity of the spinel coating or layer 22. As such, in some embodiments, alloy powders 16 including three or more metal elements can be utilized to synthesize doped, multi-cation spinels at reduced sintering temperatures.

In some embodiments, the precursor 14 can include the alloy powder 16 suspended in an ink vehicle 28. In some embodiments, the precursor 14 can include only one alloy powder 16 suspended in an ink vehicle 28. Having a single powdered additive in the precursor 14 that can include two metallic elements 24 and 26 can help reduce manufacturing costs, as it is not necessary to obtain or form multiple powders of single metal elements. In some embodiments, the precursor 14 can include a combination of metallic alloy powder with a pure metal powder, another metallic alloy powder, or a ceramic powder. In some embodiments, pore forming powder material 30 can also be included in the precursor 14.

Additionally, in some embodiments, the method 100 can include forming a Co-free spinel system, such (e.g. NiFe2O4), or using a precursor 14 that is Co-free, which can be cheaper than the Co-containing spinel systems of the prior art which were utilized to reduce sintering temperatures for spinel coatings or layers. For synthesizing a $CoMn_3O_4$ spinel layer, it has been demonstrated that the starting precursors can be a mixture of Co metal and Mn metal powders, Co metal and Mn oxide powders, or even Co oxide and Mn oxide powder, as long as the particle sizes are reasonably small. To reduce the raw material cost, the Co-free, electrically-conductive spinels such as $NiFe_2O_4$ are disclosed for use as one possible cathode-side contact material in this disclosure. Furthermore, a pre-alloyed metallic powder that contains the desired amounts of at least two metal elements can be utilized as the precursor 14 for forming a spinel-type cathode-interconnect contact layer in this disclosure. As an example, if an $NiFe_2O_4$ spinel is to be formed, an alloy powder having a target concentration of approximately 33.33 at. % Ni—66.67 at. % Fe can be utilized as the alloy powder 16 for the precursor 14. It should be noted that one commercial powder, sold as Invar 36®, or other nickel alloy 36 products, can have a suitable composition of approximately 36 wt. % Ni-64 wt. % Fe, which is very close to a target concentration.

In some embodiments, the alloy powder 16 of the precursor 14 can have a maximum particle size of 10 micrometers, 5 micrometers, 4 micrometers, 3 micrometers, 2 micrometers, or 1 micrometer. In other embodiments, the alloy powder 16 can include nano-sized or sub-micron sized particles. In some embodiments, an alloy powder 16 having the desired maximum particle sizes noted above can be prepared prior to formation of the precursor 14. The method can include the steps of preparing the precursor 14 by starting with an initial alloy powder having a maximum particle size that is greater than 10 micrometers, and processing the initial alloy powder to create a final alloy powder having a maximum particle size that is less than or equal to 10 micrometers. In some embodiments, the initial alloy powder can have a maximum particle size that is greater than 5 micrometers, and the final alloy powder can have a maximum particle size that is less than or equal to 5 micrometers. In some embodiments, the initial alloy powder can have a maximum particle size that is greater than 4 micrometers, 3 micrometers, 2 micrometers, or 1 micrometers, and the final alloy powder can have a maximum particle size that is less than or equal to 4 micrometers, 3 micrometers, 2 micrometers, or 1 micrometers, respectively. The "particle size" of the powered alloy 14 refers to the average diameter of particles of the alloy powder 16.

The alloy powder 16 can be prepared or manufactured by several different techniques. For example, the alloy of a desired composition can be produced by any melting and casting processes, then the alloy powder 16 can be generated by gas atomization or ball milling (if the alloy is brittle). Alternatively, the alloy powder 16 might be produced by direct ball milling of two metal powders, chemical reduction, etc. Since the as-processed powders are generally large in size (for example, the thermal-spray grade metal powder Invar 36® produced by gas atomization are typically around 40-50 mu-m in size), these powders likely need to be further reduced in size before they can be employed in the contact precursor 14. Several processes can be utilized to obtain the finer-sized powder with a particle diameter of around 1-5 mu-m, such as sonic sieving, water elutriation, and skimming. In the "skimming" process, an appropriate amount of suitable alcohol, such as isopropanol, can be added to the alloy powder 16 and the mixture can be sonicated to form a suspension in a glass dish and then allowed to settle for a predetermined amount of time. Due to gravitational forces, the larger particles in the mixture will settle more quickly than the smaller particles, leaving only the smaller particles in the suspension. Afterwards, the top of the suspension can be skimmed off into a dish and dried (e.g. placed onto a hot plate at 80 degrees Celsius overnight) to allow the powders to dry from the suspension. By controlling the amount of settling time, different sized powders can be obtained.

As an example, a batch of the Invar 36® alloy powder with a nominal composition of 36 wt. % Ni and 64 wt. % Fe with about 90% of the particles less than 10 micrometers was acquired from Sandvik Osprey Ltd. The alloy powder was placed in a suitable alcohol solution (isopropanol) and subjected to sonication. If the solution was skimmed right after sonication (i.e. with 0 min settling time), the maximum particle size can be reduced to about 6 micrometers, while as the settling time was increased to 5 min., the maximum particle size can be reduced to around 4 micrometers.

Once the final alloy powder 16 of the desired particle size is obtained, an ink paste precursor 14 can be prepared by mixing the alloy powder 16 with an ink vehicle 28, which can be then painted, sprayed, or screen-printed onto the substrate 12 such as, but not limited to, an electrode or interconnect of an SOFC. After the precursor 14 dries, the precursor 14 can be thermally converted to the spinel-based layer 22 by sintering the precursor 14 at less than or equal to 1000 degrees Celsius, preferably between 800-950 degrees Celsius, for several hours (e.g. 2 h) in an oxidizing environment (e.g. air).

Figure 4:
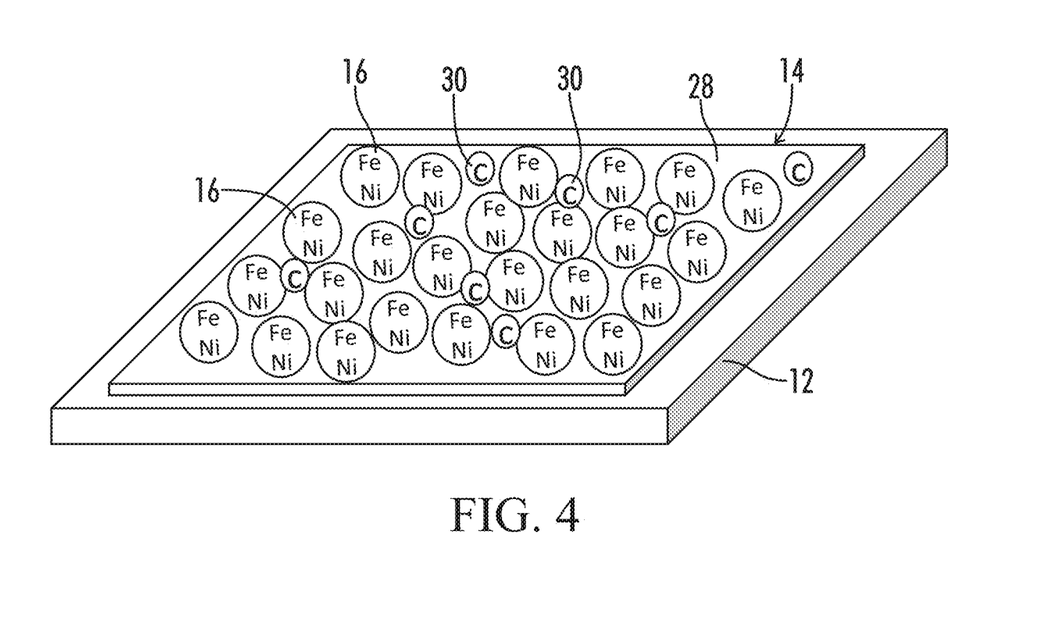
FIG. 4 is a perspective view of another embodiment of a substrate coated with a precursor including an alloy powder and a pore forming carbon powder material.
Figure 5:
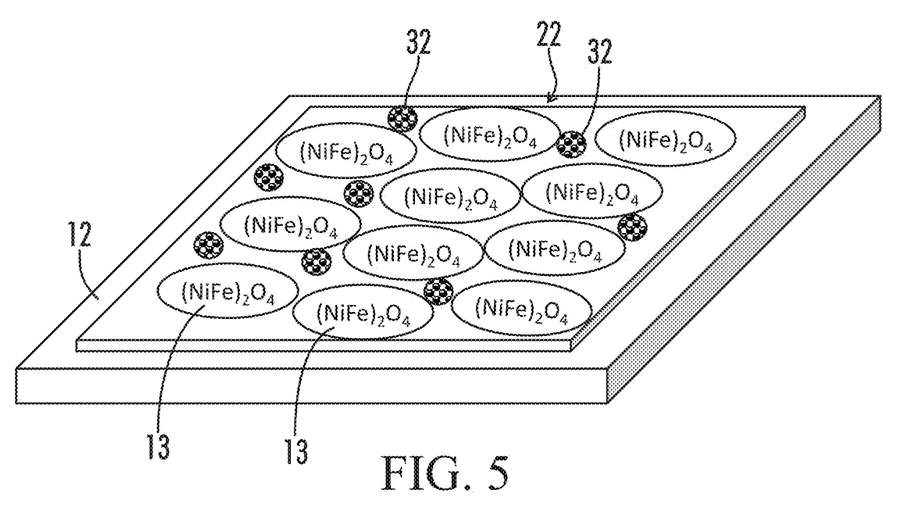
FIG. 5 is a perspective view of the precursor of FIG. 4 thermally converted after sintering to a porous $NiFe_2O_4$ spinel coating with pores formed within the spinel coating.

In some applications, it can be beneficial to form a porous spinel-type coating 22 as opposed to a more solid or dense spinal-type coating 22. For instance, a porous spinel coating 22 can be useful where it is beneficial to allow some exposure of the substrate 12 to air or other substances, such as for a cathode contact in an SOFC stack. In some embodiments, in order to form a porous spinel coating, the precursor 14 can include a pore forming material 30 which can create pores 32 in the formed spinel coating 22 after sintering, the pores 32 formed between the sintered spinel compounds 13, as shown in FIGS. 4-5.

In some embodiments, the pore forming material 30 can have a weight concentration relative to the overall weight of the precursor 14 of between 1 and 20 percent, and the spinel coating 22 formed from sintering can be a porous spinel coating 22. In some embodiments, the pore forming material 30 can have a weight concentration relative to the overall weight of the precursor 14 of between 5 and 15 percent. In some embodiments, the pore forming material 30 can be cornstarch or carbon (e.g. graphite). Such materials when heated can expand to form a porous material within the precursor 14 to form pores 32 or areas including pores 32 in the spinel coating 22 which can allow for passage of air or other fluids through or within the spinel coating or spinel layer 22. The addition of a pore former 30 in the precursor 14 can also help improve the quality of the converted spinel layer 22 (by increasing the porosity and the thermal conversion of the precursor 14 to the spinel phase in the spinel coating or layer 22). In one example, a carbon powder is added to the Invar 36® based precursor 14 at a weight concentration with respect to the precursor of 7%, which can help increase the porosity in the sintered spinel coating or layer 22 and improve the access of oxygen into the spinel coating or layer 22 during thermal conversion. After thermal conversion, a highly porous and substantially single-phase $NiFe_2O_4$ spinel layer can be achieved.

In some embodiments, after sintering the precursor 14 with the alloy powder 16 for a period of 2 hours, the spinel coating 22 formed is a substantially single-phase spinel coating. "Substantially" single-phased can mean that at least 95% of the sintering spinel coating 22 can include a dense or porous spinel phase. Substantially single-phase spinel layers can be produced in response to a substantially complete thermal conversion of the alloy powder to spinel materials. In some embodiments however, the alloy powder 16 and sintering conditions can be designed to produce a multi phased spinel coating to take advantage of different functionalities that can be provided by each phase layer of the spinel coating 22.

Figure 6:
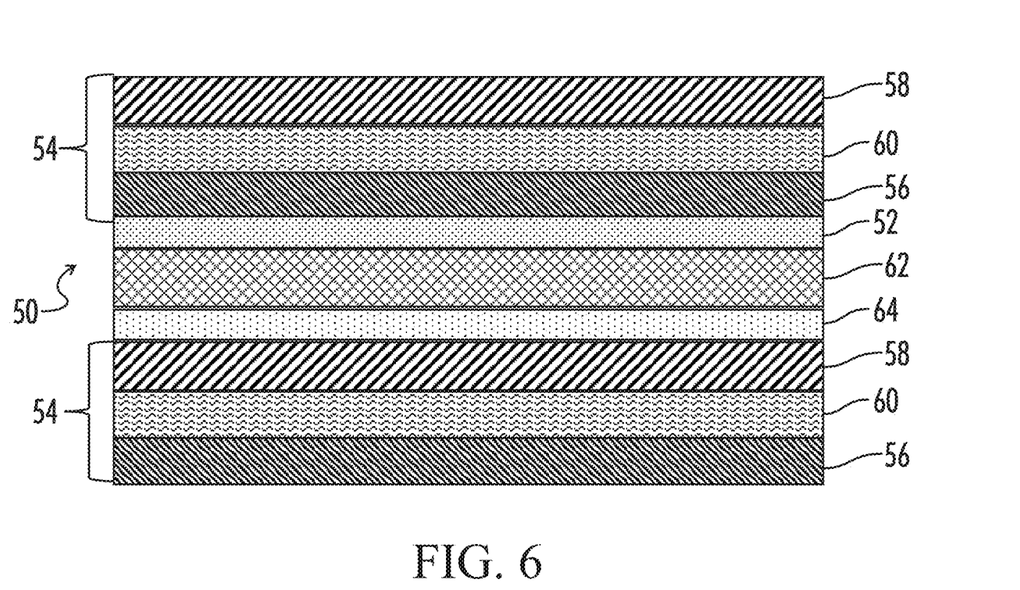
FIG. 6 is a cross sectional view of a SOFC stack which can utilize a cathode side-interconnect contact spinel coating formed via the various methods disclosed herein.
Figure 7:
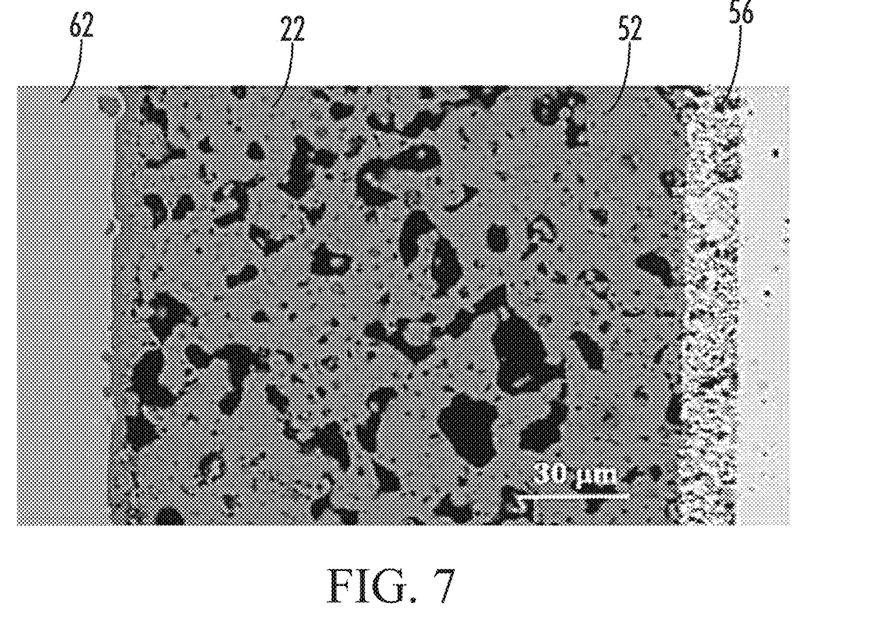
FIG. 7 is a microscopic image of a portion of a SOFC stack with a cathode side-interconnect contact spinel coating formed via the methods disclosed herein.
Figure 8:
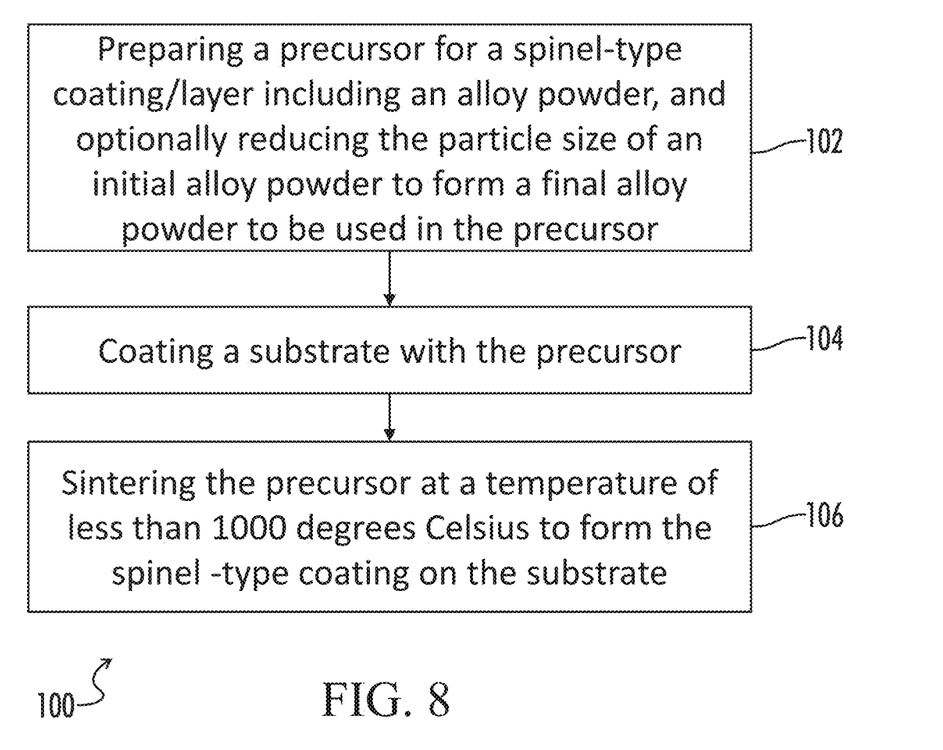
FIG. 8 is a flow diagram of one embodiment of a method of forming a spinel coating or layer of the present disclosure.

As shown in FIGS. 6-7, the method of producing a spinel coating can be utilized in an SOFC stack 50 to form a cathode-interconnect contact layer 52. Each fuel cell 54 of the SOFC stack 50 can include a cathode 56, an anode 58, and an electrolyte 60 disposed between the cathode 56 and the anode 58. Multiple fuel cells 54 can be connected to one another in succession via an interconnect 62 disposed between adjacent fuel cells 54. An anode-interconnect contact layer 64 can be positioned between the interconnect 62 and the anode 58, and a cathode-interconnect contact layer 52 can be positioned between the cathode 56 and the interconnect 62. The contact layers 52 and 64 can help maintain electrical contact between the anode 58, the interconnect 62, and the cathode 56 to facilitate the passing of electrical current between adjacent fuel cells 54. A porous cathode-interconnect contact layer 52 can be formed utilizing the methods of this disclosure. A precursor including a suitable alloy powder, such as a Ni—Fe alloy powder, can be coated on the cathode 56 or the interconnect 62 by painting, screen printing, or spraying the precursor onto a cathode 56 or interconnect 62 of the SOFC stack, and an adjacent interconnect 62 or cathode 56, respectively, can be pressed over the precursor to apply pressure to the precursor. The SOFC stack can then be sintered at a temperature of less than 1000 degrees Celsius to form a spinel cathode-interconnect contact layer 52 between the cathode 56 and the interconnect 62.

A porous cathode-interconnect contact layer 52, as shown in FIG. 7, can be utilized for the cathode-side contact 52 to facilitate the exposure of oxygen to the cathode 56 and the desired oxidation chemical reaction within a fuel cell 54 driving the flow of electrical current within the fuel cell 54.

Referring now to FIGS. 1-6, the methods and apparatuses of the present disclosure can help overcome the disadvantages of prior spinel-forming systems. In some embodiments, the method can include forming a cobalt-free spinel system (e.g. $NiFe_2O_4$), which can be cheaper than the Cobalt-containing spinel system. Secondly, in some embodiments only one alloy powder 16 is employed in the precursor 14 or contact paste, instead of two or more, which can drastically reduce the metal powder processing and mixing cost. Thirdly, the method disclosed herein can help increase the capability of producing a single-phase spinel coating/layer containing two metal elements that have significantly different oxidation rates via the utilization of a pre-alloyed powder, instead of a mixture of two metal powders. By controlling the alloy powder size, the diffusion distance to achieve a single-phase structure can be minimized and a more homogeneous microstructure can be produced.

If a mixture of separate pure Ni and Fe powders is used as the precursor for forming the NiFe2O4 layer, it has been found that after thermal conversion in air at elevated temperatures a multi-phase layer is formed, with a Fe2O3 surface layer and a spinel sub-layer embedded with discontinuous $Fe_2O_3$ and NiO particles. This is the result of the fact that Fe oxidizes much faster than Ni, forming a rapidly growing $Fe_2O_3$ scale on the surface of the spinel coating, which might block the access of oxygen to the underlying layer. Furthermore, as $Fe_2O_3$ and NiO are formed, due to the slow inter-diffusion between these oxides, a phase-pure spinel layer cannot be achieved. By using the Ni—Fe alloy powder 16, Fe oxide is formed on the particle surface of the particles of the alloy powder 16 during heating, leading to the isolation of each particle. As further oxidation continues, the NiO and $Fe_2O_3$ regions are formed, which will undergo inter-diffusion to form the spinel phase in-between. If a small-sized Invar 36® alloy powder (e.g. less than 5 mu-m) is utilized, a reduced inter-diffusion distance can be achieved. As such, a substantially phase-pure or single-phase spinel coating 22 can be obtained after a reasonable period of inter-diffusion. As such, the use of alloy powders 16 as opposed to pure metal powders can help achieve a uniform converted microstructure in the spinel coating 22.

To reactively sinter a more dense converted spinel coating or layer 22, a nano-sized alloy powder 16 can be utilized. When everything else is kept the same, as the alloy powders 16 become finer, there are more contacts/interfaces in them and the reaction during sintering can become more expedient. As a result, the sintering activity during conversion will be increased, thus leading to enhanced densification. Furthermore, with a nano-sized powder, the distance of inter-diffusion between the particles to achieve a single-phase structure will be drastically reduced, which can lead to a reduced sintering temperature for achieving a fully-dense spinel structure. Therefore, submicron or nano-sized alloy powder 16 can be employed for enhancing the densification of the spinel coating or layer 22 on the interconnect side, which will act as a protective interconnect coating.

The methods of the present invention can in some embodiments, utilize a single alloy powder in the spinel-forming contact paste or precursor 14, instead of a mixture of at least two metal and/or metal oxide powders. Even though metallic powders have been used in the prior art to reduce the sintering temperature, at least one metallic elemental powder and one additional elemental or oxide powder were mixed for achieving the desired spinel composition. By using a single alloy powder instead of a mixture of two metal powders or a mixture of a metal and a metal oxide, not only can the powder making cost be reduced, but also the need for mixing two powders can be eliminated, thus reducing labor costs as well. The spinel coating 22 composition can be easily adjusted by the alloy powder composition. By selecting an alloy composition that is free of Co or other expensive elements, the cost of the raw materials can be significantly reduced. Furthermore, by reducing the starting powder size, the interdiffusion distance to form the spinel phase is reduced, such that a single-phase spinel structure will be readily achieved. Most importantly, if separate Ni and Fe powders are used in the precursor 14 formula, the thermally-converted contact layer will contain a significant amount of NiO and $Fe_2O_3$ in addition to the targeted $NiFe_2O_4$ phase. In contrast, with an Ni—Fe alloy powder, a predominantly $NiFe_2O_4$ layer can be readily achieved after thermal conversion.

Another aspect of the spinel formation methods of this disclosure is that by adding a controlled amount of pore former into the contact paste, a layer with controlled porosity and pore distribution can be synthesized. The porosity can not only provide oxygen access to the contact layer for complete conversion during sintering, but also offer effective gas/liquid channeling. Finally, by employing nano-sized alloy powders 16, a dense coating/layer 22 can be achieved for applications such as SOFC interconnect coating.

The method of the present disclosure makes it possible to sinter a microstructurally-uniform spinel layer at a reduced sintering temperature with the use of only a single precursor alloy powder 16 in some embodiments. Both highly porous and highly dense spinel layers are achievable by controlling the starting alloy powder composition/morphology/size, optimization of the sintering conditions, and the optional addition of an appropriate pore former to form porous layers.

A variety of industries would find the method of the present disclosure useful as both porous and dense coatings and layers can be produced using a starting alloy powder with a suitable chemical composition. In particular, those who seek a low-cost process to produce a porous contact layer for cathode-side contact application with lower sintering temperatures or with better physical properties would find the methods disclosed herein beneficial.

Thus, although there have been described particular embodiments of the present invention of a new and useful REDUCED-TEMPERATURE SINTERING OF SPINEL-TYPE COATINGS AND LAYERS WITH METALLIC ALLOY POWDER PRECURSORS, it is not intended that such references be construed as limitations upon the scope of this invention.

What is claimed is:

1. A method of forming a spinel coating on a substrate comprising the steps of:
   forming a mixture of an initial alloy powder and an alcohol, allowing the mixture to settle due to gravitational forces for a predetermined period of time, skimming a top portion of the mixture, and drying the skimmed top portion of the mixture to obtain a final alloy powder;
   coating at least a portion of the substrate with a precursor including the final alloy powder; and
   sintering the precursor at a temperature of less than 1000 degrees Celsius to form the spinel coating.

2. The method of claim 1, wherein the initial alloy powder is made from an alloy of at least two metals.

3. The method of claim 2, wherein the initial metal alloy powder is made from an alloy of nickel and iron.

4. The method of claim 1, wherein the sintering step is performed at a temperature of between 800 and 950 degrees Celsius.

5. The method of claim 1, wherein the precursor further comprises the final alloy powder suspended in an ink vehicle.

6. The method of claim 1, wherein after sintering the precursor for a period of 2 hours, the spinel coating formed is a substantially single phase spinel coating.

7. The method of claim 1, wherein the final alloy powder of the precursor has a maximum particle size of 5 micrometers.

8. The method of claim 1, wherein the final alloy powder of the precursor has a maximum particle size of 1 micrometer.

9. The method of claim 1, wherein the substrate is a cathode of a solid oxide fuel cell.

10. The method of claim 1, further comprising the steps of preparing the initial alloy powder by:
    starting with the initial alloy powder having a maximum particle size that is greater than 5 micrometers; and
    processing the initial alloy powder to create a final alloy powder having a maximum particle size that is less than or equal to 5 micrometers.

11. The method of claim 1, wherein:
the precursor includes a pore forming material having a weight concentration relative to an overall weight of the precursor of between 1 and 20 percent; and
the spinel coating formed from sintering is a porous spinel coating.

12. The method of claim 11, wherein the pore forming material is cornstarch or carbon.

13. The method of claim 1, wherein the final alloy powder includes nano-sized particles.

14. A method of forming a spinel coating on a substrate comprising the steps of:
starting with an initial alloy powder having a maximum particle size that is greater than 5 micrometers;
processing the initial alloy powder to create a final powdered metal alloy having a maximum particle size of 5 micrometers, wherein processing the initial alloy powder includes direct ball milling of the initial alloy powder;
coating at least a portion of the substrate with a precursor including the final powdered metal alloy; and
sintering the precursor at a temperature of less than 700 degrees Celsius to form the spinel coating, wherein after sintering the precursor for a period of 2 hours, the spinel coating formed is a substantially single-phase spinel coating.

15. A method of forming a spinel coating on a substrate comprising the steps of:
coating at least a portion of the substrate with a precursor including a powdered metal alloy of nickel and iron, the powdered metal alloy of the precursor having a maximum particle size of 5 micrometers; and
sintering the precursor at a temperature of between 800-950 degrees Celsius and a predetermined pressure of between 10 and 5000 PSI to form the spinel coating.

* * * * *